United States Patent [19]

Doyle et al.

[11] 4,088,297
[45] May 9, 1978

[54] TIMED METERING VALVE

[75] Inventors: Darrold E. Doyle, Plano, Ill.; Thomas G. Barnum, Fox Point, Wis.

[73] Assignee: Bradley Corporation, Menomonee Falls, Wis.

[21] Appl. No.: 738,598

[22] Filed: Nov. 3, 1976

[51] Int. Cl.² .......................................... F16K 31/383
[52] U.S. Cl. .......................................... 251/44; 251/4; 251/33
[58] Field of Search ...................... 251/45, 44, 33, 46, 251/43, 34, 4; 137/489, 491

[56] References Cited

U.S. PATENT DOCUMENTS

| | | | |
|---|---|---|---|
| 822,306 | 6/1906 | Sanger | 251/44 X |
| 1,560,770 | 11/1925 | Everstam | 251/44 |
| 2,464,917 | 3/1949 | Babson | 251/4 |
| 2,664,095 | 12/1953 | Magni | 251/4 |
| 3,543,795 | 12/1970 | Schwindt | 251/44 |
| 3,934,816 | 1/1976 | Terrell | 251/44 X |

*Primary Examiner*—Arnold Rosenthal
*Attorney, Agent, or Firm*—Thad F. Kryshak

[57] ABSTRACT

A timed metering valve includes a valve body having an inlet and an outlet which are connected by a passageway surrounded by a valve seat at its upper periphery; a cylinder; a movable piston having a front face and a rear face positioned in said cylinder, the front face of said piston normally being seated upon the valve seat preventing the flow of fluid through said passageway; a bypass circuit leading from the inlet through a timing mechanism to a pressure chamber behind the rear face of the piston so that supply line pressure sensed by the rear face of the piston maintains the valve in the closed position; and relief valve means for relieving the pressure in said pressure chamber so that the supply line pressure can move the front face of the piston off its seat to open the valve. The timing mechanism comprises a disc of deformable material which is positioned in and is completely contained about its periphery by a bore in the bypass circuit, the disc has an axial passage through which fluid must pass to reach the pressure chamber and an adjustable member is provided which can be adjusted to exert an axially directed force upon the disc to deform the material of the disc into the axial opening thereby effectively reducing its effective diameter. In a preferred embodiment, especially useful for institutional shower installations, the valve is provided with a vented cover and a push button to activate the relief valve.

2 Claims, 8 Drawing Figures

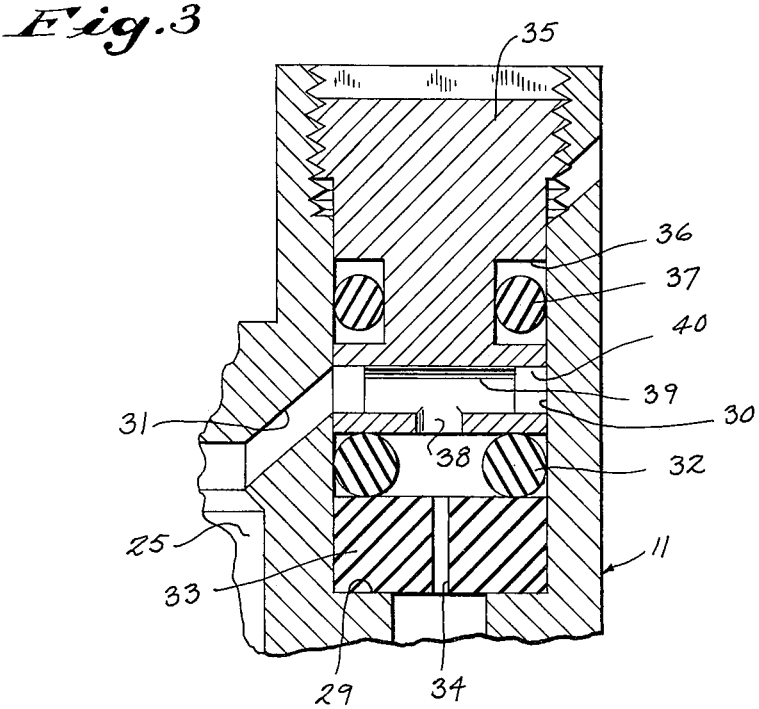
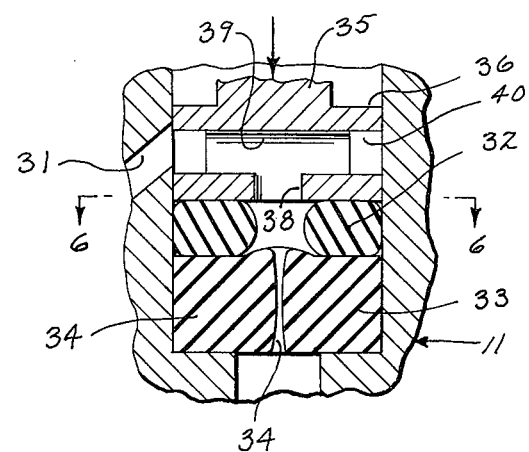
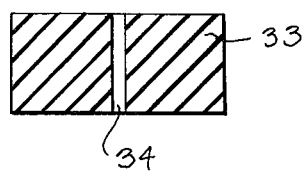
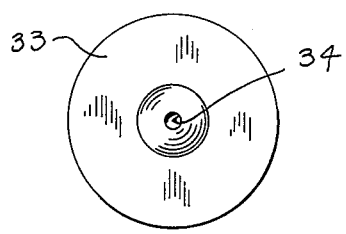
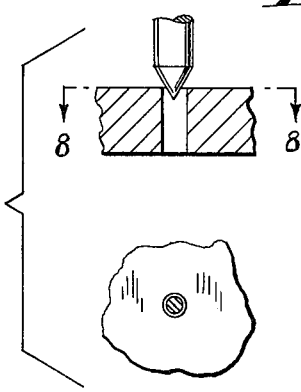
PRIOR ART

TIMED METERING VALVE

BACKGROUND OF THE INVENTION

Timed metering valves are preferred for use in a variety of installations in which it is desired to automatically stop flow through the valve after a given length of time has lapsed or a given volume of fluid has been delivered. For example, timed metering valves are useful to control showers in institutions where it is desirable to have valves which are easily activated but which will automatically close to prevent excess waste of water.

In most timed metering valves, the length of time the valve remains open after being actuated is determined by the length of time required for a pressure chamber to fill and to move a member to seal off flow through the valve. The length of time required to fill the chamber is usually controlled by an adjustable needle valve interposed in the bypass circuit. The rate of flow through the bypass circuit and as a result the length of time required to fill the pressure chamber are determined by the clearance between the needle valve and its housing. Although timed metering valves employing needle valves as timing control mechanisms are commercially available, they are not completely satisfactory. In some instances, the timing mechanism fails because the relatively small clearance between the needle and its housing becomes clogged by particulate matter suspended in the fluid being controlled or its "limes" up as a result of the formation of deposits from dissolved impurities in the controlled fluid and as a result, flow through the bypass circuit is reduced or erratic.

Other types of timing mechanisms that have been employed in timed metering valves are devices that operate by the distortion of parts manufactured to close tolerances, miniature conventional valves, and valves that operate by compressing permeable or porous media. However, none of the prior art valves are completely satisfactory as they either require manufacturing to close tolerances; they are sensitive to formation of deposits from dissolved impurities; they are sensitive to the presence of suspended particulate matter; they require expensive linkages or they have no inherent ability to maintain constant flow over a range of supply pressure.

SUMMARY OF THE INVENTION

It is the general object of this invention to disclose a timed metering valve which is relatively trouble free, dependable and inexpensive.

It is a further object to disclose a timed metering valve with a timing mechanism which has reduced susceptibility to clogging by either dissolved or suspended foreign materials in the controlled fluid.

It is a still further object to disclose a timed metering valve which can effectively operate with lower operating force levels.

The timed metering valve of the present invention includes a valve body having an inlet and an outlet connected by a passageway which is surrounded at its upper periphery by a valve seat; a cylinder; a movable piston having a front face and a rear face positioned in said cylinder, the front face of said piston normally being seated upon said valve seat preventing the flow of fluid through said passageway; a bypass circuit leading from the inlet through a timing mechanism to a pressure chamber behind the rear face of the piston so that supply line pressure sensed by the rear face maintains the valve in a closed position; and relief valve means for relieving the pressure in the chamber so that supply line pressure can move the front face of the piston off its seat to open the valve. The timing mechanism for the timed metering valve of the present invention includes a disc of deformable material which is positioned in and which is completely contained about its periphery by a bore in the bypass circuit which prevents the disc from being deformed other than axially. The disc is provided with a central axial passage through which the fluid must pass to reach the pressure chamber and an adjustable member is provided to selectively compress the disc axially so as to cause the material of the disc to be deformed into the axial passage of the disc. The deformation of the disc material into the axial opening reduces the effective diameter of the disc and slows the rate at which fluid passes through the axial opening and the pressure chamber refills. When the pressure chamber is completely refilled, supply line pressure is once again sensed by the rear face of the piston and the piston moves so that the front face of the piston seats on the valve seat and flow through the valve is stopped. In a preferred embodiment, the pressure relief valve is activated by a push button and the valve is provided with a vented cover.

The timed metering valve of the present invention because of the single hole geometry of its timing mechanism is relatively maintenance free and can be used to control fluids containing dissolved and suspended particulate matter which would clog conventional timing valves equipped with needle valve controls. In addition, because of its unique timing mechanism, the present valve can be used to accomplish finely metered control of fluid flow at extremely small flow rates.

It is also an object of the present invention to disclose a timed metering valve which is inexpensive to manufacture as none of the components need to be manufactured to close tolerances and it does not employ expensive linkages.

These and other objects are obtainable by the practice of the present invention.

BRIEF DESCRIPTION OF THE DRAWINGS

FIG. 3 is an enlarged detail section taken along lines 3—3 of FIG. 1;

FIG. 4 is a sectional view of the disc showing the normal shape of the axial opening;

FIG. 5 is an enlarged section showing the disc deformed under axial pressure;

FIG. 6 is a top view of the disc taken along lines 6—6 of FIG. 5;

FIG. 7 is an elevational view partially in section of a needle valve of the prior art; and FIG. 8 is a top view taken along lines 8—8 of FIG. 7 showing the flow area about the needle.

DESCRIPTION OF THE PREFERRED EMBODIMENT

Figure 1:
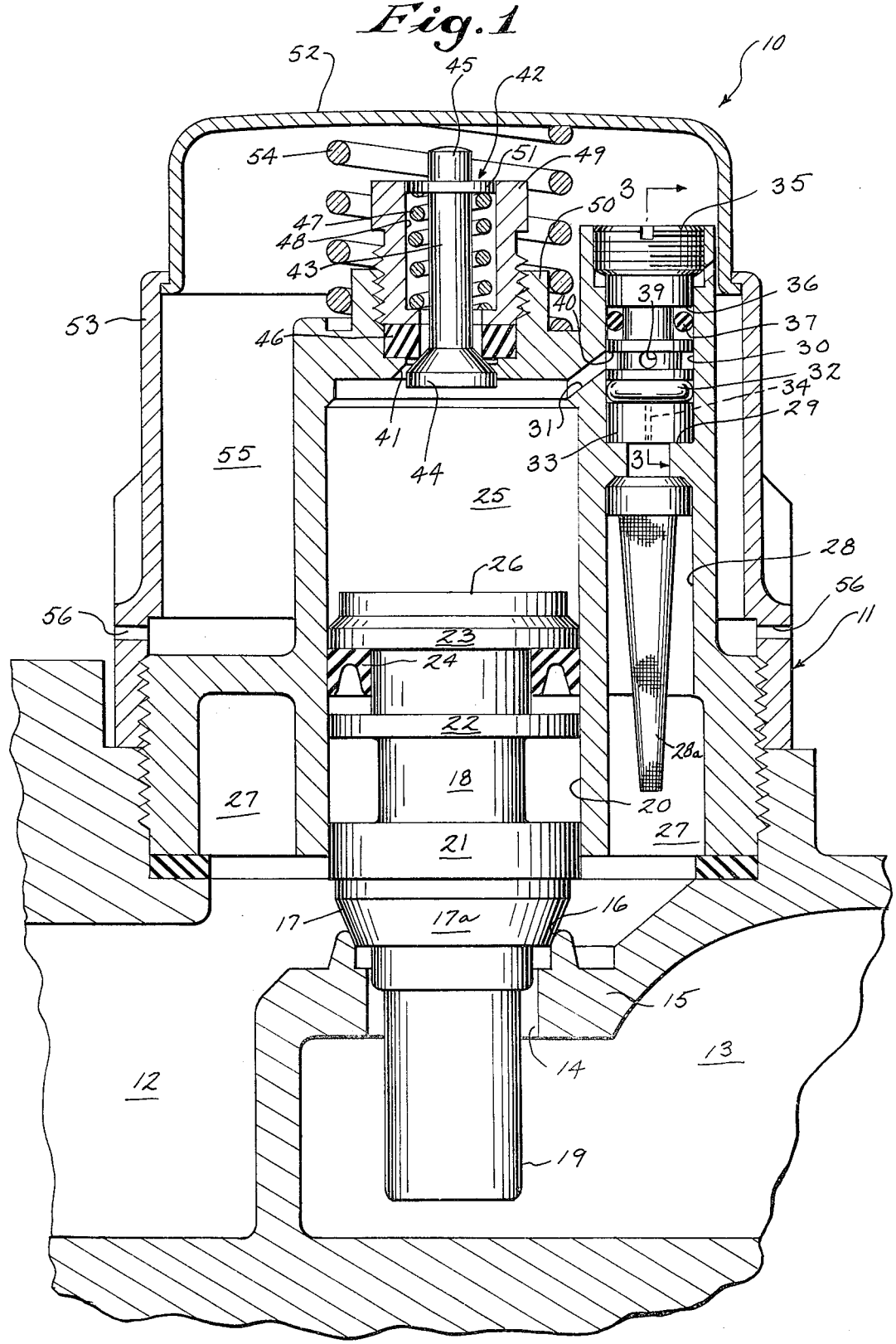
FIG. 1 is a longitudinal sectional view of the valve of the present invention in the closed position.
Figure 2:
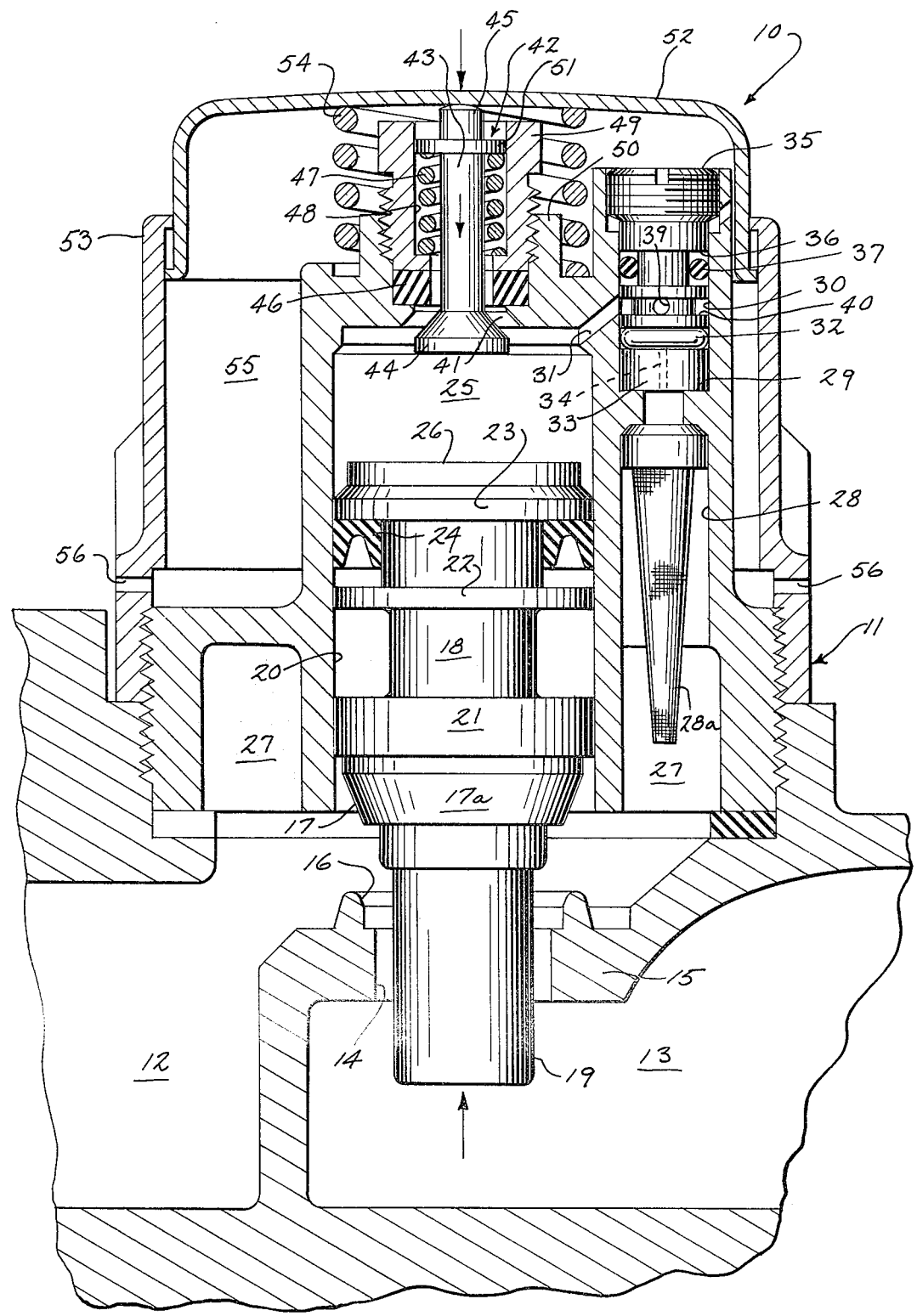
FIG. 2 is a longitudinal sectional view of the valve of the present invention in the partially open position.

Referring to FIG. 1 of the drawings, it can be seen that the valve of the present invention which is generally referred to by the numeral 10 includes a valve body 11 having an inlet 12 and an outlet 13 which are connected through a passageway 14 formed in a wall 15 disposed between the inlet and the outlet. The upper periphery of the passageway 14 is surrounding by a valve seat 16. When the valve is closed as in FIG. 1, the front face 17 of a piston 18 is seated upon the valve seat 16 thereby stopping flow through the passageway 14 and the elongated nose 19 of the piston extends into the outlet 13. To assist in forming a fluid-tight seal, the front face 17 of the piston is preferably provided with a resilient seat washer 17a. The piston 18 is positioned within a cylinder 20 and is slidably movable within the cylinder to open and close the valve as seen in FIGS. 1 and 2. The piston is guided for vertical movement within a cylinder by the radial flanges 21, 22 and 23. To prevent fluid from passing between the piston 18 and the inner wall of the cylinder 20, a U-cup washer 24 is positioned about the main body of the piston to form a fluid-tight seal.

Returning now to FIG. 1, it can be seen that when the valve is closed, a pressure chamber 25 exists in the upper part of the cylinder 20 and is filled with water. Supply line pressure is transferred to the pressure chamber via a bypass circuit which leads from the inlet 12 to the chamber 25 where it is sensed by the rear face 26 of the piston 18 and is effective to maintain the front face 17 of the piston 18 seated on the valve seat 16. The result is the valve remains closed.

The bypass circuit by which the supply line pressure is transferred to the pressure chamber 25 leads from the inlet 12 to a cylindrical chamber 27 which leads completely about the outer wall of the cylinder 30, and communicates with a vertical passageway 28 which is partially closed by an internal flange 29. The vertical passageway 28, which is provided with a filter 28a, communicates through an opening in the flange 29 with a timing mechanism bore 30 which in turn leads to a passage 31 which communicates with the pressure chamber 25.

Turning now to FIG. 3, which is an enlarged view of the section of the valve including the timing mechanism, it can be seen that a disc 33 of deformable material having an axial opening 34 extending therethrough rests upon the top of the flange 29 which serves as the bottom of the timing mechanism bore 30. In the undeformed disc 33 as seen only in FIG. 4, the axial opening 34 is of uniform diameter throughout. Supported upon the upper surface of the disc 33 is a resilient o-ring 32.

Returning now to FIG. 3, it can be seen that positioned above the o-ring 32 and closing the open end of the timing mechanism bore is a threaded timing adjustment screw 35 which is threadably engaged in the upper portion of the bore 30. The timing adjustment screw 35 is provided with a circumferential groove 36 in which an o-ring 37 is positioned to form a fluid-tight seal between the wall of the bore 30 and the timing adjustment screw 35. The timing screw 35 has an axial passageway 38 which is slightly larger than but is aligned with the axial opening 34 in the disc and a radial passage 39 which leads from the passageway 38 to a circumferential groove 40 which communicates with the passage 31 which leads to the pressure chamber 25. The threaded end portion of the timing adjustment screw 35 cooperates with the internal threaded portion of the bore 30 to both retain the screw 35 in position and to permit adjustment of the screw to compress the deformable disc 33, as seen best in FIG. 5.

Returning now to FIG. 1, it can be seen that the top of the valve body 11 is provided with an opening 41 which leads from the top of the cylinder 20 to the outside. The opening is normally closed by a relief valve indicated generally by the numeral 42. The relief valve 42 includes a poppet 43 having an enlarged head 44 and an elongated stem 45. The underside of the head 44 is yieldably urged to a closed position in which it is seated on a rubber valve seat 46 surrounding the opening 41 by a compression spring 47. The compression spring 47 is retained in a spring retaining recess 48 in a gland nut 49 which in turn is threadably engaged in a cylindrical upper portion 50 of the valve body 11. The gland nut 49 also retains the rubber valve seat 46 in position.

The spring 47 is retained in the recess 48 of the gland nut 49 by a spring retaining ring 51 which has a central opening (not seen) through which the stem 4 of the poppet can extend. As seen in FIG. 1, the free end of the stem 45 of the poppet 43 extends above the top surface of the cylindrical upper portion 50 of the valve body 11. A push button 52 which forms part of the cover assembly 53 surrounding the main body of the valve is spaced from the free end of the stem by a relatively large compression spring 54.

Turning now to FIG. 2, it can be seen that when it is desired to open the valve, the push buttom 52 is depressed, the spring 54 is compressed and the poppet 43 is moved so that the underside of the poppet head 44 leaves the valve seat 46 permitting water to leave the pressure chamber 25 via the opening 41. As the water leaves the chamber 25, the pressure upon the rear face 26 of the piston 18 is relieved and the piston 18 is moved up the cylinder by supply line pressure on the front face 17 of the piston. As a result, the front face 17 of the piston 18 leaves the valve seat 16 and the valve is opened. As the water leaves the pressure chamber 25 through the opening 41, it flows along the stem 45, between the top of the cylindrical portion 50 and the underside of the push button 52 and into the chamber 55 between the outer wall of the valve body and the inner wall of the cover 53. It leaves the chamber 55 through vents 56 which communicate with the outside. If desired, an escutcheon (not shown) can be provided so that the water leaving the vents 56 is not obvious.

As soon as the cylinder 20 is purged of water and air by the piston 18 rising completely to the top of the cylinder 20 and the push button 52 is released, the poppet assembly 42 assumes the position seen in FIG. 1 and the pressure chamber 25 begins to refill with water via the bypass circuit. The length of time required to fill the pressure chamber 25 and to once again close the valve is controlled by the adjustment of the timing adjustment screw 35 and the resultant degree of deformation of the disc material into the opening 34.

Returning again to the enlarged view of the timing mechanism section of the valve seen in FIG. 3, it can be seen that a portion of the deformable material of the disc 33 has been forced into the axial opening 34 to reduce the effective area of the opening. The result is that the rate of flow through the opening is less than through the non-deformed opening shown in FIG. 4.

In the preferred embodiment of the invention, the disc 33 is a relatively thick circular member of a deformable elastomeric material such as silicone rubber and the axial passageway 34 is 0.01 inches to 0.02 inches in the diameter. The external diameter of the disc 33 is such that when it is placed in position in the bore 30, it will be completely contained about its periphery by the bore so that the disc 33 can only be compressed axially.

Referring now to FIGS. 5, 6, 7 and 8, it can be seen that as compared to the prior art needle valve assemblies, the timing mechanism of the present invention provides a much less obstructed flow passage. In needle valve assemblies the opening through which the fluid must pass is a narrow annular opening or clearance that exists between the outside diameter of the needle and its housing as seen in FIGS. 7 and 8. The flow rate through the needle valve is determined by the overall area of the opening but the susceptibility to clogging or limiting is determined by the narrowness of the clearance. It is obvious from a comparison of FIGS. 6 and 8, that for a given area of opening the single axial opening 34 of the disc 33 is less susceptible to problems caused by foreign materials than is the narrow annular opening of a needle-type valve. It has been found that debris as large as 0.005 inches will pass through and not clog the partially deformed single hole opening of the disc whereas a needle valve offering the same area of flow is susceptible to clogging by debris as small as .00001 inches.

In the preferred embodiment of the valve shown in FIGS. 1 and 2, the piston 18 has been provided with an elongated nose 19 which projects through the valve seat 16 even when the valve is open as seen in FIG. 2. This arrangement because of the clearance between the piston nose 19 and the valve seat 16, results in a 2–5 psi drop in water pressure across the seat 16 at normal flow. As a result, full supply line pressure acts upon the rear face 26 of the piston producing a closing force which is approximately equal to the area of the piston nose times the pressure drop across the seat acts on the front face 17 of the piston. The sense of the force on the piston 18 is to lower the piston towards the seated or shut-off position. Of course, the piston will not seat to close the valve until the pressure chamber 25 has filled and the pressure on the rear face 26 of the piston is greater than that on the front face.

Another advantage of the preferred embodiment of the timed metering valve is that because it does not employ a spring in connection with the piston operation, it is capable of operating effectively at very low force levels, e.g. 1–2 pounds which makes it possible to have longer metering times with less metering fluid. In contrast, some of the prior art valves require as much as 25–30 pounds of pressure and much higher rates of flow for effective operation.

From the foregoing description it will be apparent that the novel timed metering valve of the present invention can be used in a wide variety of applications in which it is desired to have a reliable trouble-free valve that delivers a given amount of fluid in a set period of time.

It will also be apparent to those skilled in the art that a number of changes and modifications can be made without departing from the spirit and scope of the present invention. For example, springs can be employed in connection with piston operation, if desired, or the various components can be changed in size or shape as long as they function as required. Therefore, no limitations are to be placed upon the invention other than those set forth in the following claims.

We claim:

1. In a timed metering valve for controlling the flow of water which includes a valve body having an inlet and an outlet which are connected by a passageway surrounded by a valve seat at its upper periphery; a cylinder; a movable piston having a front face and rear face positioned in said cylinder, the front face of said piston being normally seated upon the valve seat preventing the flow of water through said passageway; a bypass circuit leading from the inlet through a timing mechanism to a pressure chamber behind the rear face of the piston so that supply line pressure sensed by the rear face of the piston maintains the valve in a closed position; and relief valve means for relieving the pressure in said pressure chamber so that the supply line pressure can move the front face of the piston off its seat to open the valve, the combination comprising:

(a) an enlongated nose on the front face of the piston, which nose projects below the valve seat even when the valve is open so that clearance between the piston nose and the valve seat results in a pressure drop across the seat at normal flow and as a result a reduced pressure acts on the front face of the piston;

(b) an improved timing mechanism which comprises a disc-like member of elastomeric material which is positioned in and which is completely contained about its periphery by a bore in the bypass circuit, an axial passage in said member through which water must pass to reach the pressure chamber and a timing adjustment screw having an axial passageway which is aligned with the axial opening in the disc member and a radial passage which leads from the axial passageway to the pressure chamber of the valve, which timing adjustment screw can be adjusted to exert an axially directed force upon the disc-like member to deform the material of the member into the axial passage thereby effectively reducing its effective diameter and controlling the time required to fill the pressure chamber and close the valve;

(c) relief valve means including an opening to the pressure chamber which is surrounded by a valve seat, said opening being closed by a poppet having an enlarged head the underside of which is seated upon the valve seat and an elongated stem, and spring means yieldably urging the poppet head into seating engagement with the valve seat, and (d) a cover assembly covering the top of the valve body including the relief valve, said cover assembly including vauts to the outside and a push button spaced from the free end of the stem of the poppet of the relief valve by a compression spring so that when the push button is depressed the spring is compressed and the poppet is moved off its valve seat by the push button so that pressure is relieved in the pressure chamber by permitting the water to leave the pressure chamber and flow about the head of the poppet and stem into the cover assembly from which it exits through said vent.

2. The timed metering valve of claim 1 in which the disc-like member is of silicon rubber and the axial passageway is 0.01 inches to 0.02 inches in diameter.

* * * * *